United States Patent [19]

Bowler et al.

[11] Patent Number: 5,338,252
[45] Date of Patent: Aug. 16, 1994

[54] AIR OUTLET LOUVER ASSEMBLY

[75] Inventors: Geoffrey H. Bowler, Port Perry; Bruce H. B. Chow, Scarborough, both of Canada

[73] Assignee: Manchester Plastics, Ltd., Scarborough, Canada

[21] Appl. No.: 58,451

[22] Filed: May 6, 1993

[51] Int. Cl.⁵ .............................................. B60H 1/34
[52] U.S. Cl. ................................... 454/155; 454/315; 454/320; 454/322
[58] Field of Search ............... 454/109, 152, 155, 313, 454/315, 318, 319, 320, 322, 333

[56] References Cited

U.S. PATENT DOCUMENTS

| | | |
|---|---|---|
| 1,204,713 | 11/1916 | Strain et al. |
| 1,206,025 | 11/1916 | Nuckles. |
| 2,905,984 | 9/1959 | Sconzo. |
| 2,935,926 | 5/1960 | Parrish. |
| 2,973,666 | 3/1961 | Fuller ............................. 74/531 |
| 3,001,250 | 9/1961 | Kenny. |
| 3,145,642 | 8/1964 | Radcliff. |
| 3,188,074 | 6/1965 | Revitz et al. |
| 3,189,339 | 6/1965 | Siciliano. |
| 3,296,740 | 1/1967 | Sconzo ............................. 49/87 |
| 3,412,506 | 11/1968 | Shiota ............................. 49/82 |
| 3,537,331 | 11/1970 | Rifkin ............................. 74/528 |
| 3,636,854 | 1/1972 | Cary. |
| 3,701,311 | 10/1972 | McLarty. |
| 3,735,691 | 5/1973 | Gofton et al. ................ 454/155 X |
| 3,861,281 | 1/1975 | Godwin. |
| 3,954,023 | 5/1976 | Perez-Aguilar ................ 74/533 |
| 4,268,995 | 5/1981 | Villa ................................. 49/87 |
| 4,345,510 | 8/1982 | Sterett ...................... 454/155 X |
| 4,534,275 | 8/1985 | Hofmann ..................... 454/152 |
| 4,646,625 | 3/1987 | Schroeder. |
| 4,699,322 | 10/1987 | Jobst ............................. 239/503 |
| 4,702,156 | 10/1987 | Sand ............................ 454/313 |
| 4,796,518 | 1/1989 | Murray ......................... 454/155 |

FOREIGN PATENT DOCUMENTS

| | | | |
|---|---|---|---|
| 289065 | 11/1988 | European Pat. Off. .......... 454/155 |
| 91142 | 7/1981 | Japan ............................ 454/155 |
| 83839 | 4/1986 | Japan ............................ 454/155 |
| 2196421 | 4/1988 | United Kingdom ............ 454/155 |

Primary Examiner—Harold Joyce
Attorney, Agent, or Firm—Reising, Ethington, Barnard, Perry & Milton

[57] ABSTRACT

An air outlet louver assembly (10) includes a housing (12), primary vanes (14,36), secondary vanes (48,49), and a damper door (86). A control handle (58) independently controls the primary and secondary vanes (14,36,48,49), and a wheel (100) controls the damper door (86). Ridges (74) on a secondary vane (48) engage a control fork (66) on the control handle (58) to provide ratcheting control of the primary vanes (14,36) by the control handle (58). A nub (82) on a secondary vane (48) contacts depressions (80) in the housing (12) to provide ratcheting control of the secondary vanes (48,49). Frictional contact between a nub (106) on the wheel (100) and depressions (108) in the housing (12) provide ratcheting control of the damper door (86).

27 Claims, 3 Drawing Sheets

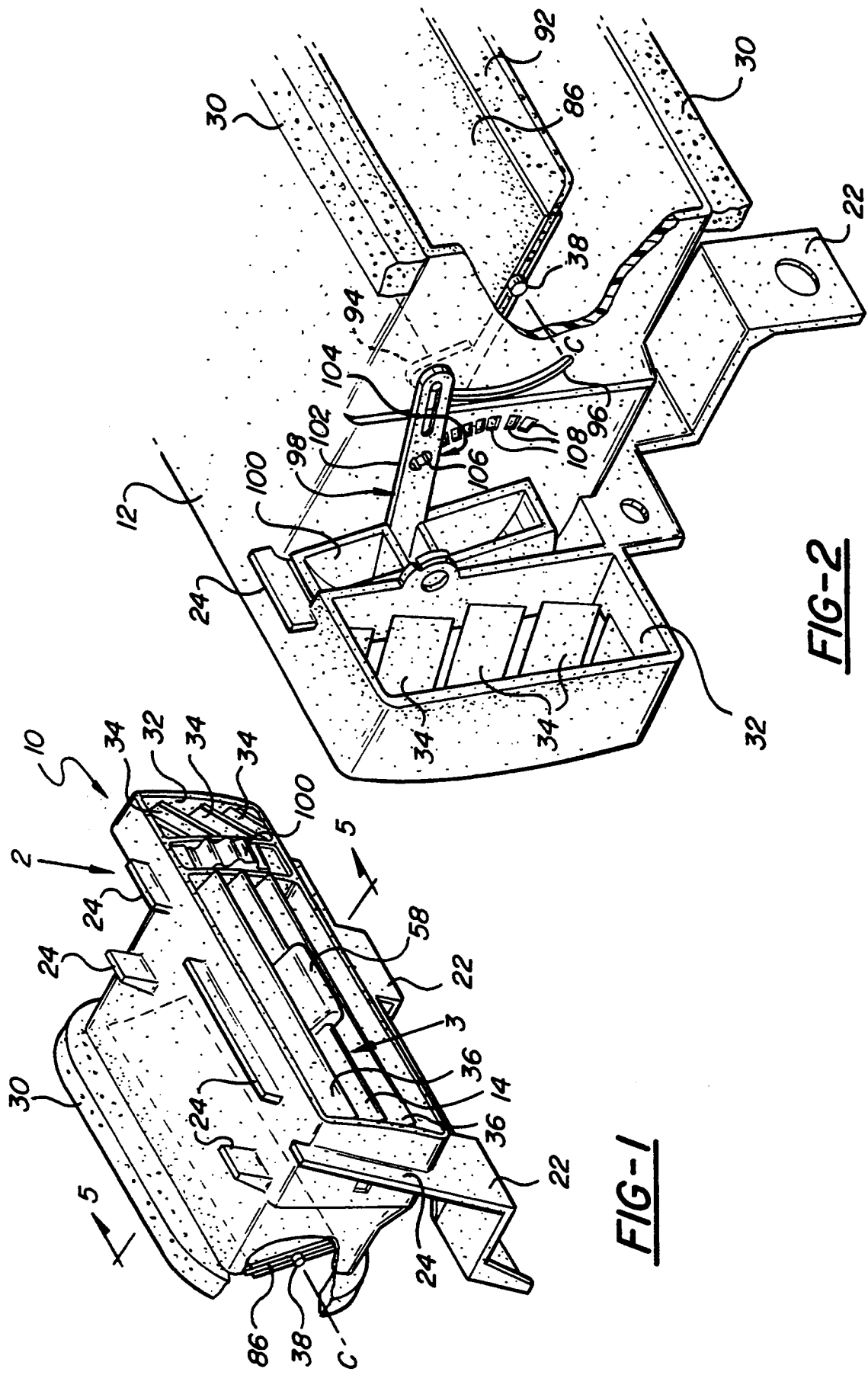

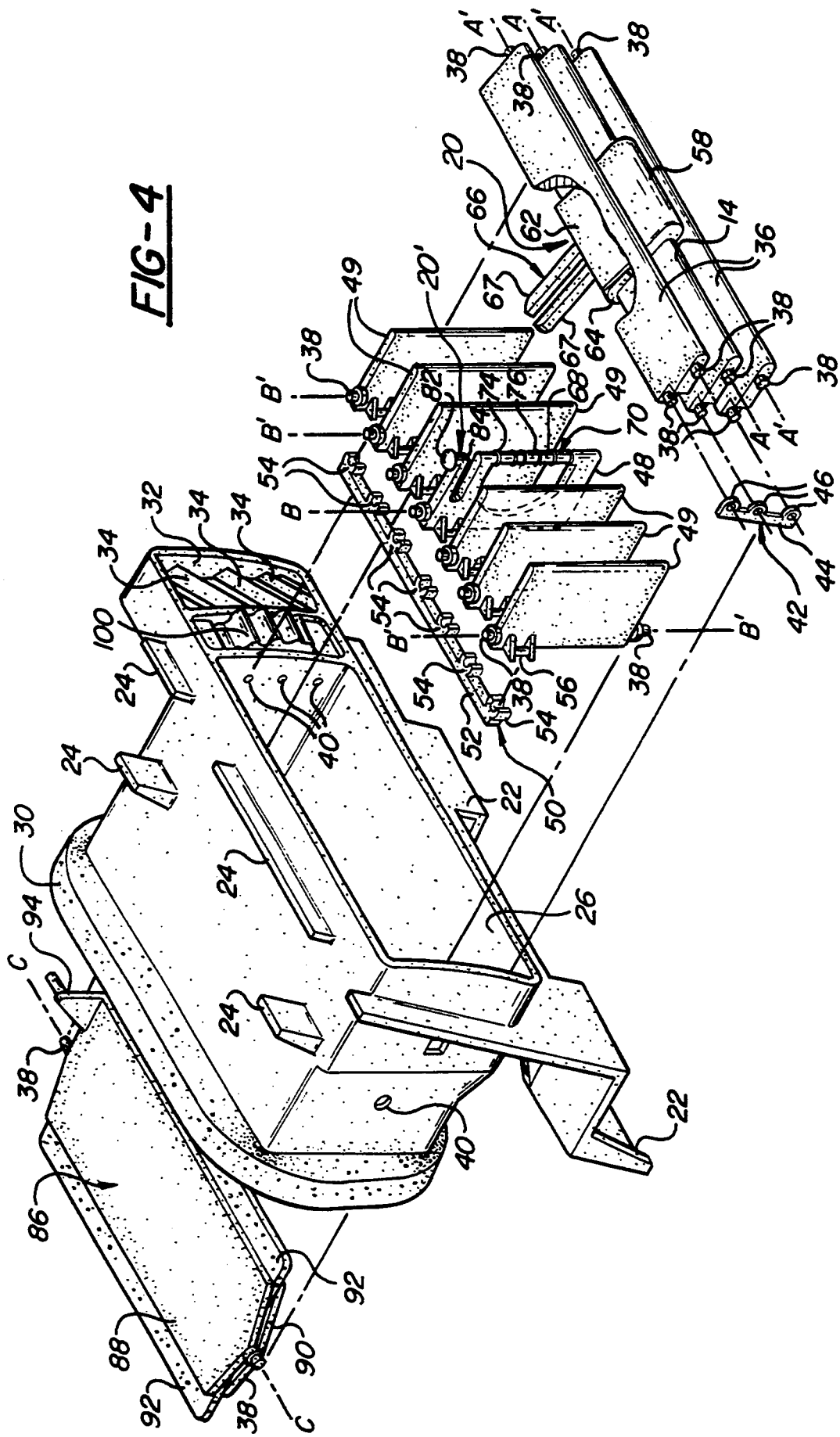

AIR OUTLET LOUVER ASSEMBLY

TECHNICAL FIELD

The subject invention relates to an air outlet louver assembly for providing incremental adjustment of the direction and volume of airflow therefrom.

BACKGROUND ART

Air outlet louver assemblies are commonly used in automobile ventilation systems to permit a user to adjust the direction and volume of airflow into a passenger compartment of an automobile. Louver assemblies generally include one or two sets of directional vanes that are pivotally disposed within a housing and at least one control handle to adjust the position of the vanes within the housing. In addition, many louver assemblies include a damper door that pivots within the housing to adjust the volume of airflow through the housing.

To improve the ease with which a user can adjust the vanes, many louver assemblies include a positioning device to provide intermittent frictional resistance to movement of the vanes and create spaced rest locations for the vanes. In other words, two-way ratcheting control is provided to improve the "feel" of a control handle during adjustment of the vanes. The ratchet device thus makes it easier for a user to adjust the vanes in discrete increments and also maintains the vanes in their selected position in spite of any bumps or jarring motion received by the automobile.

For example, U.S. Pat. No. 3,861,281 to Godwin illustrates an outlet louver of this type. The louver includes a plurality of directional vanes pivotally disposed within a first housing for adjusting the horizontal direction of airflow when moved. In addition, the first housing pivots within a second housing to adjust the vertical direction of airflow. The first housing includes a plurality of ridges along an outer surface thereof in sliding frictional contact with an arm extending from the second housing. In this manner, ratcheting control is provided for the pivotal movement of the first housing within the second housing.

However, in Godwin U.S. Pat. No. 3,861,281 the first housing extends outwardly from the second housing upon pivotal movement with respect to the second housing. In addition to providing a potential hazard to passengers, extension of the first housing outside of the second housing disrupts the aesthetic contour of the dashboard. To avoid these problems, modern outlet louver assemblies utilize a single housing including two sets of directional vanes disposed for pivotal movement within the housing. This eliminates the need for pivotal motion of the first housing because the two sets of directional vanes provide complete directional control of the airflow. However, ratcheting contact between a first and second housing is precluded with only one housing.

To solve this problem, ratcheting systems for single-housing outlet louvers have been designed. U.S. Pat. No. 3,735,691 to Gofton et al. illustrates an outlet louver of this type. The louver includes a housing 12 and a plurality of vanes 36 pivotally disposed therein. A gang bar 48 is attached to each of the vanes 36 for joining the vanes in coupled pivotal motion within the housing 12. Ratchet teeth 52 on the gang bar 48 interact with grooves 26 on the housing to provide ratcheting control of the vanes 36. However, the Gofton U.S. Pat. No. 3,735,691 ratchet system will not work in systems without a gang bar 48, such as those with only one directional vane. In addition, the gang bar 48 must be located immediately adjacent the housing 12, reducing design options for the outlet louver.

SUMMARY OF THE INVENTION AND ADVANTAGES

The present invention provides an air outlet louver assembly for providing incremental and accurate adjustment of the direction and volume of airflow therefrom. The assembly includes a housing and a vane mounted within the housing for pivotal movement about an axis for controlling the direction and flow of air out of the housing. The invention is characterized by ratchet pawl means disposed on said vane for moving together with said vane in coupled rotation about said axis and for frictionally engaging a ratchet surface to intermittently resist movement of said vane and establish a plurality of spaced rest locations for said vane.

The present invention is advantageous by providing ratcheting control directly between the vane and the housing. In this manner, ratcheting control can be provided for a system that does not include a gang bar, such as a one-vane system. In addition, ratcheting control can be provided for a system that does not include relative movement between first and second housings.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a front perspective view of the outlet louver assembly of the present invention;

FIG. 2 is a perspective view of the right side of the outlet louver assembly as indicated by Arrow 2 in FIG. 1;

FIG. 4 is an exploded view of the outlet louver assembly; and

DETAILED DESCRIPTION OF THE PREFERRED EMBODIMENT

The present invention provides an air outlet louver assembly 10 for providing incremental and accurate adjustment of the direction and volume of airflow therefrom. The assembly 10 includes a housing 12, a vane 14,48 mounted within the housing 12 for pivotal movement about an axis A,B for controlling the direction and flow of air out of the housing 12, and a ratchet pawl means 20,20' disposed on the vane 14,48 and pivotal about the axis A,B for frictionally intermittently resisting movement of vane 14,48 with respect to the housing 12 to establish a plurality of spaced rest locations for the vane 14,48.

Figure 5:
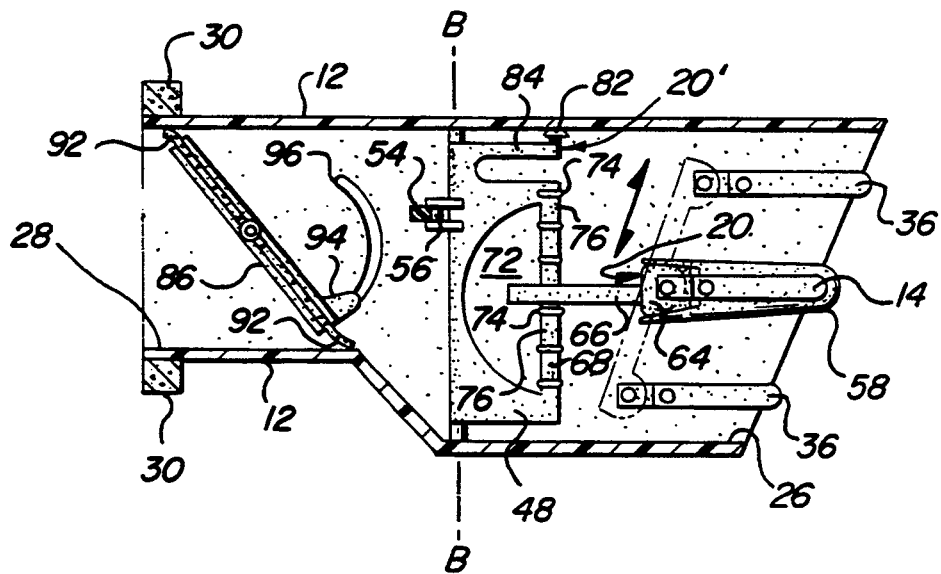
FIG. 5 is a cross sectional view of the outlet louver assembly taken along line 5—5 of FIG. 1.

As shown in FIG. 1, the housing 12 is a substantially rectangular member to be mounted within an opening in a dashboard of an automobile or other vehicle (not shown). The housing 12 includes a plurality of mounting brackets 22 which provide convenient mounting locations for attaching the housing 12 to the dashboard. In addition, a plurality of mounting flanges 24 extend beyond the opening in the dashboard and prevent the housing 12 from moving forward through the opening. The housing 12 includes a front opening 26 and a rear opening 28 as shown in FIG. 5. The rear opening 28 is placed within an air source (not shown) of slightly larger diameter than the rear opening 28. A foam strip 30 is placed about the housing 12 adjacent the rear opening 28 to provide a tight seal between the rear opening 28 and the air source.

The housing 12 also includes a window vent 32 disposed adjacent the front opening 26 as illustrated in FIG. 1. The window vent 32 includes a plurality of fixed vanes 34 for directing air laterally with respect to the housing 12. By mounting the housing 12 in the dashboard adjacent a window (not shown), the window vent 32 directs air toward the window independently of the orientation of the vane 14,48. Thus, when necessary, a small quantity of air can be strategically directed toward the window to defrost the window and permit a driver to see through the window.

As shown best in FIG. 4, a primary control vane 14 is disposed within the housing 12 for pivotal movement about a first axis A. In addition, two primary directional vanes 36 are each pivotally disposed within the housing 12 about discrete axes of rotation A' parallel to the first axis A. The primary vanes 14,36 each include two pivot studs 38 for mounting within holes 40 in the housing 12. The studs 38 provide pivot points for the primary vanes 14,36 with respect to the housing 12 and define the parallel axes of rotation A,A' for each primary vane 14,36.

A primary coupling means 42 for joining the primary vanes 14,36 in coupled rotation about the parallel axes of rotation A,A' is attached to each primary vane 14,36. The primary coupling means 40 comprises a primary gang bar 44 including three pivot holes 46 therein. Each primary vane 14,36 includes a pivot stud 38 disposed through the pivot holes 46. Accordingly, pivotal motion initiated by one of the primary vanes 14,36 is transmitted through the primary gang bar 42 to the remaining primary vanes 14,36. Therefore, identical motion in all three primary vanes 14,36 is produced by actuating only one of the primary vanes 14,36.

Figure 3:
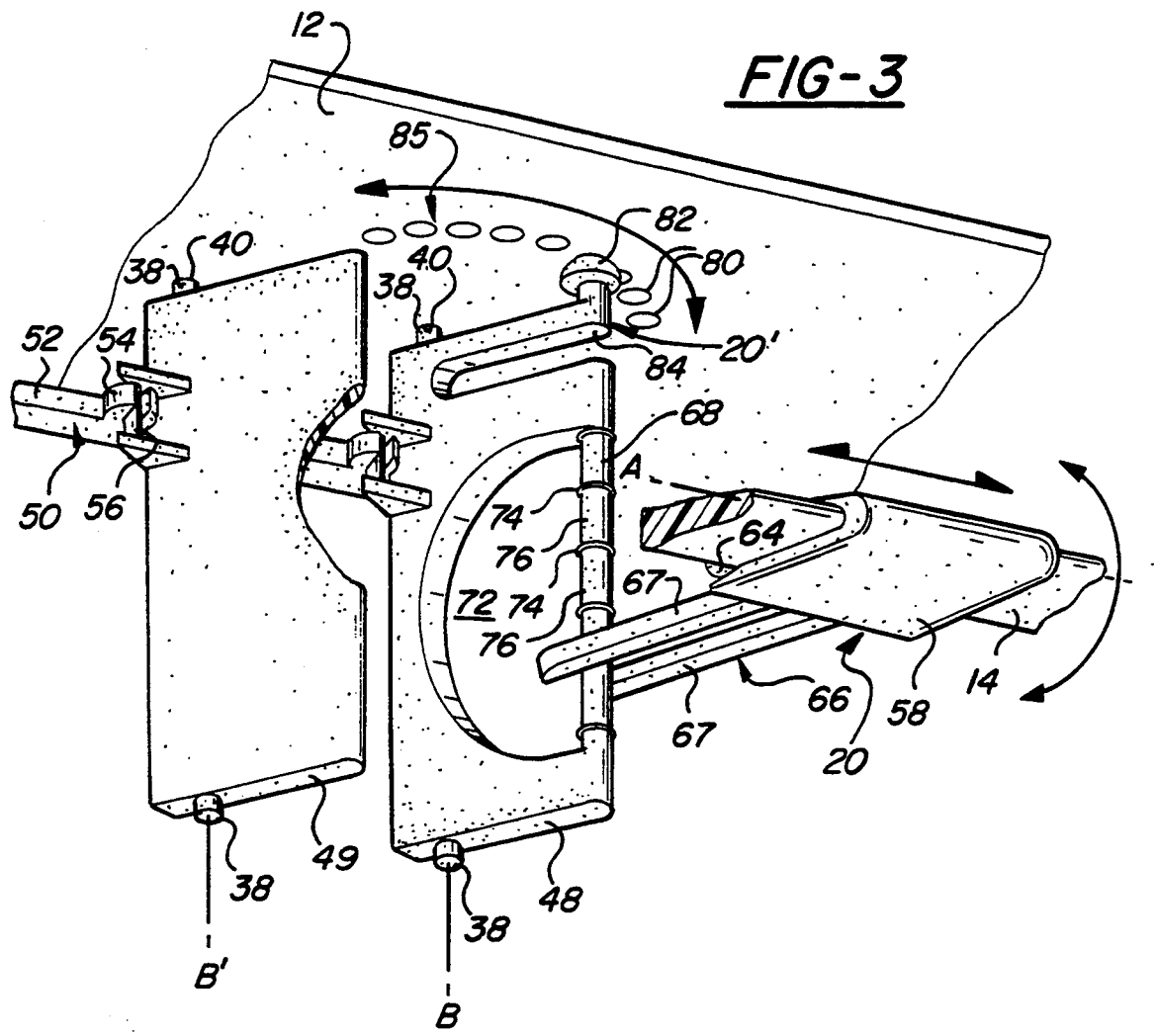
FIG. 3 is a fragmentary view of the directional vanes and housing inside the outlet louver assembly as indicated by Arrow 3 in FIG. 1.

A secondary control vane 48 is disposed within the housing 12 for pivotal movement about a second axis B offset from the first axis A for controlling the direction and flow of air out of the housing 12. Furthermore, six secondary directional vanes 49 are each mounted within the housing 12 for pivotal movement about a discrete axis B' parallel to the second axis B. The axes of rotation B,B' of the secondary vanes 48,49 are non-parallel with the axes of rotation A,A' of the primary vanes 14,36. More specifically, the secondary vanes 48,49 pivot about vertical axes of rotation B,B' while the primary vanes 14,36 pivot about horizontal axes of rotation A,A'. As shown in FIGS. 3 and 4, the secondary vanes 48,49 each include two pivot studs 38 for mounting within holes 40 in the housing 12. The studs 38 provide pivot points for the secondary directional vanes 48,49 with respect to the housing 12 and define the parallel axes of rotation B,B' for each secondary vane 48,49.

A secondary coupling means 50 operates in similar fashion to the primary coupling means 42 discussed above and joins the secondary vanes 48,49 in coupled rotation about the parallel axes of rotation B,B'. The secondary coupling means 50 comprises a secondary gang bar 52 including seven C-shaped retaining clips 54. Each secondary vane 48,49 includes a pivot bar 56 which snaps into a retaining clip 54 in pivotal engagement therewith. In this manner, pivotal motion initiated by one of the secondary vanes 48,49 will be transmitted through the secondary gang bar 52 to the remaining secondary vanes 48,49. Therefore, identical motion in all seven secondary vanes 48,49 can be produced by actuating only one of the secondary vanes 48,49.

A ratchet pawl means 20 is disposed on the primary control vane 14 and includes a control handle 58 operatively engaged with the primary control vane 14 and slidably disposed thereon. In the preferred embodiment, the control handle 58 comprises a top section 62 and a bottom section 64 which snap fit together around the primary control vane 14 to connect and retain the control handle 58 thereabout. The ratchet pawl means 20 further includes a projection 66 extending from the primary control vane 14. Specifically, a control fork 66 is provided on the control handle 58 which straddles the secondary control vane 48 to connect the control handle 58 to the secondary control vane 48. The control fork 66 comprises two resilient arms 67 biased against the secondary control vane 48 in frictional contact therewith.

As illustrated in FIG. 3, a ratchet surface 68 is disposed along an edge of one of the secondary vanes 48 in slidable contact with the ratchet pawl means 20. Specifically, the control fork 66 straddles the ratchet surface 68 in slidable frictional contact therewith. As the primary control vane 14 pivots about the first axis A, the control handle 58 and control fork 66 also pivot in coupled rotation with the primary control vane 14 about the first axis A. The ratchet surface 68 includes a control bar 70, and a cavity 72 is disposed in the secondary vane 48 underneath the control bar 70. In this manner, the control fork 66 extends through the cavity 72 upon pivotal movement of the secondary vanes 48,49.

The ratchet surface 68 includes a plurality of ridges 74 disposed circumferentially about the control bar 70 at spaced intervals. Accordingly, the ratchet surface 68 includes a plurality of spaced depressions 76 disposed in intermittent frictional contact with the resilient arms 67 on the control fork 66. The depressions 76 comprise valleys disposed between the ridges 74 on the ratchet surface 68. The ridges 74 provide intermittent, cyclical frictional resistance to movement of the control fork 66 and control handle 58 against the control bar 70 and create staggered rest locations 76 for the control fork 66 between each ridge 74. The ridges 74 produce a "clicking" sound and an accompanying vibration through the control handle 58 during movement thereof, providing a user with additional sensory inputs to aid in controlling the movement of the control handle 58.

A ratchet pawl means 20' is also provided on the secondary control vane 48 for frictionally intermittently resisting movement of the secondary vanes 48,49 with respect to the housing 12 to establish a plurality of spaced rest locations for the secondary vanes 48,49. The ratchet pawl means 20' comprises a projection, or more specifically a resilient arm 84, integral with the secondary control vane 48 and extending therefrom. The resilient arm 84 includes a hub 82 disposed on a distal end thereof in slidable frictional contact with the housing 12. As the secondary control vane 48 pivots about the second axis B, the resilient arm 84 and nub 82 also pivot in coupled rotation with the secondary control vane 48 about the second axis B.

A ratchet surface 85 is disposed on the housing 12 in slidable contact with the ratchet pawl means 20'. The ratchet surface 85 includes a plurality of spaced depressions, or more specifically dimples 80, disposed in intermittent frictional contact with the nub 82 on the resilient arm 84. Because the secondary vanes 48,49 generally pivot in an arcuate path with respect to the housing 12, the spaced depressions 80 are disposed in an arcuate manner along the housing 12 to follow the arcuate path of the secondary nub 82 on the secondary control vane 48.

The secondary nub 82 comprises a hemispherical projection extending from the secondary control vane 48 and is subject to intermittent, cyclical frictional resistance when moved across the housing 12 against the depressions 80. As will be appreciated, the secondary nub 82 may take other formations, such as frustoconical. The resilient, or spring loaded, arm 84 extending outwardly from the secondary control vane 48 biases the nub 82 against the housing 12. As the secondary nub 82 travels along the housing 12, the depressions 80 provide areas of low potential energy for the secondary nub 82. In other words, the depressions 80 provide a series of spaced rest locations for the secondary nub 82. As the secondary nub 82 moves between depressions 80, however, the arm 84 biases the secondary nub 82 in frictional contact with an edge of each depression 80 and with the housing 12. In similar fashion to the ratchet pawl means 20, this intermittent frictional resistance produces a "clicking" sound and accompanying vibration which will aid a user in controlling the movement of the secondary vanes 48,49.

A damper vane 86 is mounted within the housing 12 for pivotal movement about a third axis C to control the volume of airflow through the outlet louver assembly 10. The damper vane 86 is shown best in FIG. 4 and comprises a top plate 88, a bottom plate 90, a foam pad 92 sandwiched between the plates 88,90, two pivot studs 38, and a control arm 94. The pivot studs 38 are disposed within holes 40 in the housing 12 to provide pivotal motion of the damper vane 86 within the housing 12. As shown in FIG. 5, the foam pad 92 provides a flexible seal between the housing 12 and the damper vane 86 to further restrict the airflow through the housing 12. As shown in FIG. 2, the control arm 94 extends through a groove 96 in the housing 12 to guide and limit the arcuate travel of the damper vane 86 within the housing 12.

The damper vane 86 includes a damper control means 98 shown in FIG. 2 for controlling the relative position of the damper vane 86 with respect to the housing 12. The damper control means 98 includes a damper control handle 100, or wheel, rotatably disposed within the housing 12. A control lever 102 comprising a resilient arm extends from the control handle 100 in slidable frictional contact with the housing 12. The control lever 102 is operatively engaged with the control arm 94 on the damper vane 86 such that actuation of the damper control handle 100 produces corresponding movement in the damper vane 86.

The damper control means 98 includes a damper ratchet pawl means 104 disposed on the damper control handle 100 for frictionally intermittently resisting movement of the damper control handle 100 with respect to the housing 12 to establish a plurality of spaced rest locations for the damper control handle 100. The damper ratchet pawl means 104 includes the control lever 102 and a damper nub 106 disposed on the control lever 102 extending toward the housing 12 in slidable contact therewith. A plurality of spaced dimples 108 are disposed on the housing 12 in slidable, intermittent frictional engagement with the damper hub 106. In similar fashion to the secondary positioning means 78, the damper hub 106 and depressions 108 coact to provide intermittent, cyclical frictional resistance to movement of the damper vane 86. The resilient control lever 102 provides a biasing force to place the damper nub 106 in frictional engagement with the depressions 108.

In operation, the position of the primary vanes 14,36 is adjusted by moving the control handle 58 vertically. This causes the primary vanes 14,36 to pivot with respect to the housing 12, as well as produce a corresponding movement in the control fork 66 across the ridges 74 on the control bar 68 and provide a two-way ratcheting effect. The ratcheting action does not perform in the traditional sense because the primary vanes are still moveable in two directions. The ratcheting means 20 merely provides intermittent frictional resistance to movement of the primary vanes 14 to improve the "feel" during adjustment of the primary vanes 14.

A user can also independently adjust the secondary vanes 48 by sliding the control handle 58 horizontally along the primary control vane 14. This causes the control fork 66 to move horizontally against the control bar 68 and force the secondary vanes 48,49 to pivot with respect to the housing 12. As the secondary vanes 48,49 pivot, the secondary nub 82 provides a two-way ratcheting effect against the spaced depressions 80 in the housing. Similarly, actuation of the wheel 100 produces two-way ratcheting action of the damper vane 86 within the housing 12 as the damper nub 106 engages with the dimples 108 in the housing 12.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. An air outlet louver assembly (10) for providing incremental and accurate adjustment of the direction and volume of airflow therefrom, said assembly (10) comprising:

a housing (12);

a primary control vane (14);

a secondary control vane (48);

said primary control vane (14) being mounted within said housing (12) for pivotal movement independent of said secondary control vane (48) about a first axis (A) for controlling the direction and flow of air out of said housing (12);

said secondary control vane (48) being mounted within said housing (12) for pivotal movement independent of said primary control vane (14) about a second axis (B) offset from said first axis (A);

a ratchet surface (68) disposed on said secondary control vane (48); and characterized by ratchet pawl means (20) disposed on said primary control vane (14) for moving together with said primary control vane (14) in coupled rotation about said first axis (A) to frictionally engage said ratchet surface (68) and for maintaining said engagement with said ratchet surface (68)

during the independent movement of said secondary control vane (48) with respect to said primary control vane (14) to intermittently resist movement of said primary control vane (14) and establish a plurality of spaced rest locations for said primary control vane (14).

2. An assembly as set forth in claim 1 further characterized by said ratchet pawl means (20) comprising a projection (66) extending from said primary control vane (14).

3. An assembly as set forth in claim 2 further characterized by said projection comprising a resilient arm (66).

4. An assembly as set forth in claim 3 further characterized by said ratchet surface (68) including a plurality of spaced depressions (76) disposed in intermittent frictional contact with said resilient arm (66).

5. An assembly as set forth in claim 4 further characterized by said ratchet surface (68) including a plurality of spaced ridges (74) thereon.

6. An assembly as set forth in claim 5 further characterized by said depressions (76) comprising valleys disposed between said ridges (74) on said ratchet surface (68).

7. An assembly as set forth in claim 16 further characterized by said ratchet pawl means (20) being slidably disposed on said primary control vane (14).

8. An assembly as set forth in claim 7 further characterized by said ratchet pawl means (20) including a control handle (58) for controlling said pivotal movement of said primary control vane (14) and said slidable movement of said ratchet pawl means (20).

9. An assembly as set forth in claim 8 further characterized by said projection (66) comprising a fork (66) extending from said control handle (58) and straddling said ratchet surface (68).

10. An assembly as set forth in claim 7 further characterized by a plurality of primary directional vanes (36) each mounted within said housing (12) for pivotal movement about a discrete axis (A') parallel to said first axis (A).

11. An assembly as set forth in claim 10 further characterized by primary coupling means (42) attached to each of said primary directional vanes (36) and to said primary control vane (14) for joining said primary vanes (14,36) in coupled rotation about said parallel axes (A,A').

12. An assembly as set forth in claim 11 further characterized by a plurality of secondary directional vanes (49) each mounted within said housing (12) for pivotal movement about a discrete axis of rotation (B') parallel to said second axis (B).

13. An assembly as set forth in claim 12 further characterized by secondary coupling means (50) attached to each of said secondary directional vanes (49) for joining said secondary vanes (49) in coupled rotation about said parallel axes of rotation (B').

14. An assembly as set forth in claim 1 further characterized by a further ratchet surface (85) comprising a plurality of depressions (80) disposed on said housing (12) and a further ratchet pawl means (20') comprising a resilient arm (84) extending from said secondary control vane (48) to frictionally engage secondary control vane (48) to frictionally engage said further ratchet surface (85).

15. An assembly as set forth in claim 14 further characterized by said depressions (80) comprising a plurality of dimples (80) disposed in a spaced relationship on said housing (12).

16. An assembly as set forth in claim 15 further characterized by said dimples (80) being disposed in an arcuate path.

17. An assembly as set forth in claim 14 further characterized by a nub (82) disposed on said resilient arm (84).

18. An assembly as set forth in claim 14 further characterized by a plurality of secondary directional vanes (36) each mounted within said housing (12) for pivotal movement about a discrete axis of rotation (B') parallel to said second axis (B).

19. An assembly as set forth in claim 18 further characterized by secondary coupling means (50) attached to each of said secondary directional vanes (49) and to said secondary control vane (48) for joining said secondary vanes (48,49) in coupled rotation about said parallel axes of rotation (B,B').

20. An assembly as set forth in claim 1 further characterized by a damper vane (86) mounted within said housing (12) for pivotal movement about a third axis of rotation (C).

21. An assembly as set forth in claim 20 further characterized by a damper control means (98) operatively engaged with said damper vane (86) for controlling said pivotal movement of said damper vane (86).

22. An assembly as set forth in claim 21 further characterized by said damper control means (98) including a damper control handle (100).

23. An assembly as set forth in claim 22 further characterized by damper ratchet pawl means (104) disposed on said damper control handle (100) for frictionally intermittently resisting movement of said damper control handle (100) with respect to said housing (12) to establish a plurality of spaced rest locations (108) for said damper control handle (100).

24. An assembly as set forth in claim 23 further characterized by said damper control handle (100) including an resilient arm (102) extending from said control handle (100) in slidable frictional contact with said housing (12).

25. An assembly as set forth in claim 24 further characterized by a nub (106) disposed on said resilient arm (102) in slidable frictional contact with said housing (12).

26. An assembly as set forth in claim 25 further characterized by a plurality of spaced dimples (108) disposed in said housing (12) in intermittent frictional contact with said hub (106).

27. An air outlet louver assembly (10) for providing incremental and accurate adjustment of the direction and volume of airflow therefrom, said assembly (10) comprising:
 a housing (12);
 a primary control vane (14) mounted within said housing (12) for pivotal movement about a first axis (A) for controlling the direction and flow of air out of said housing (12);
 a secondary control vane (48) mounted within said housing (12) for pivotal movement about a second axis (B) for controlling the direction and flow of air out of said housing (12);
 a damper vane (86) mounted within said housing (12) for pivotal movement about a third axis (C) for controlling the direction and flow of air out of said housing (12);

a resilient arm (84) disposed on said secondary control vane (48) in slidable frictional contact with said housing (12);

a fork (66) on said primary vane (14) straddling said secondary vane (48) and in slidable frictional contact with said secondary vane (48);

a control handle (100) operatively engaged with said damper vane (86) for controlling said pivotal movement of said damper vane (86);

a plurality of spaced dimples (80) disposed in said housing (12) in intermittent frictional contact with said resilient arm (84);

a plurality of ridges (74) on said secondary control vane (48) in intermittent frictional contact with said fork (66); and a plurality of dimples (108) disposed in said housing (12) in intermittent frictional contact with said control handle (100).

* * * * *